July 10, 1928.
J. HOPKIRK ET AL
1,676,693
MILKING MACHINE RELEASER
Filed Jan. 3, 1927
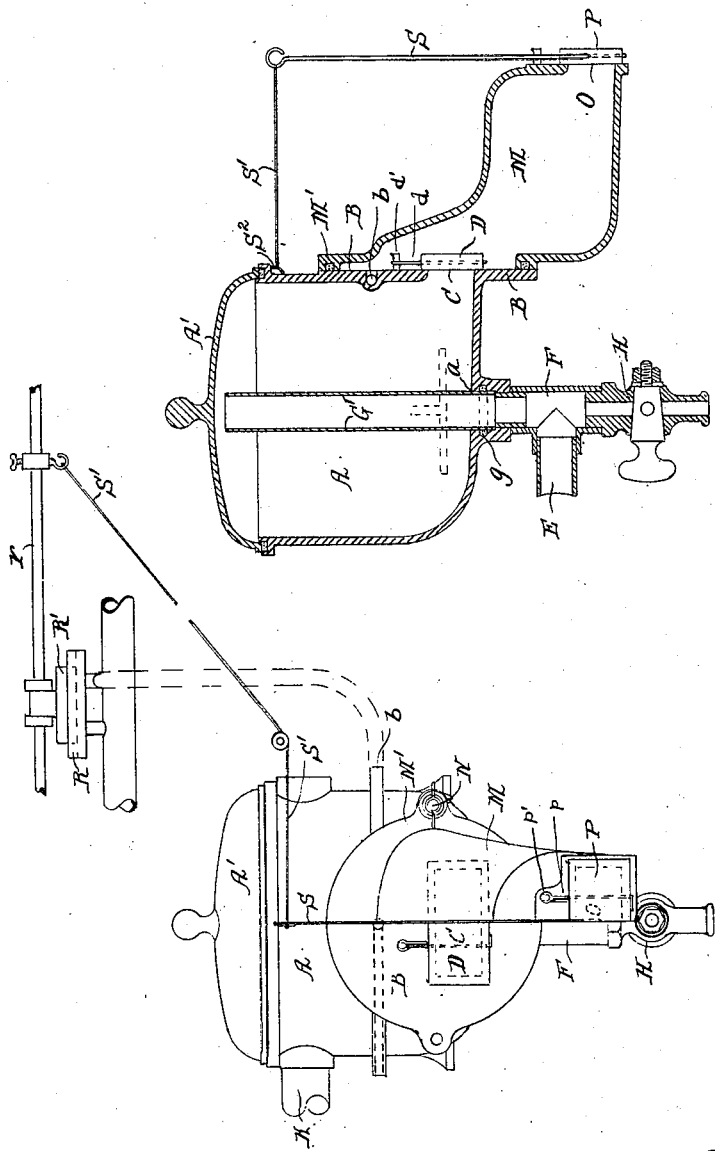
Inventors:
Joseph Hopkirk
and George William Gane
By
Attorney.

Patented July 10, 1928.

1,676,693

UNITED STATES PATENT OFFICE.

JOSEPH HOPKIRK, OF CAMBRIDGE, AND GEORGE WILLIAM GANE, OF NORMANBY, NEW ZEALAND.

MILKING-MACHINE RELEASER.

Application filed January 3, 1927. Serial No. 158,699.

This invention relates to a special construction of releaser apparatus for use in milking machine installations for the purpose of receiving the milk drawn along the vacuum milk main and for delivering it to open receiving vessels without interfering with the continuation of the milking operations.

The invention relates to that special known class of apparatus designed for this purpose comprising two chambers disposed at different levels and the upper of which chambers communicates with the lower chamber through an outwardly opening gravity flap valve and the lower chamber of which also has a gravity discharge flap valve. The upper chamber, known as the receiving chamber, is in constant connection with the milking vacuum and has the milk main leading into it so that the milking is carried on through this chamber and the milk is drawn into it from the main. The lower chamber, known as the discharging chamber, is connected to a pulsator apparatus, by the operation of which it is alternately opened to the atmosphere and connected with the vacuum source of the installation, at regular intervals.

In the working of such a releaser therefore, when the discharge chamber is exhausted of air, its discharge valve is kept closed by the atmospheric pressure upon its outside and the valve communicating with the receiving chamber is free to open with the weight of milk in such chamber so that the milk will flow through into the discharge chamber. Then when the discharge chamber has air admitted to it to break down its vacuum, the air pressure acts on the communicating valve to close it and keep it closed, while this chamber's own valve is free to open by the pressure of the weight of milk upon it with the result that the milk escapes through this valve into the open.

This type of machine and its method of working are very well known in the art and no further description thereof is needed for a proper understanding of the present invention, which consists in special features of construction and means for operation under which the working of the releaser is made more effective through the more positive action of its valves, and other advantages also are obtained.

The invention therefore will be fully described in relation to the accompanying drawings, in which:—

Figure 1 is a front elevation of the releaser assembled for use but with one half of the discharge chamber cut away.

Figure 2 is a sectional side elevation of the complete releaser.

A is the receiving chamber which is made with an open top and provided with a cover A' for sealing it. It is also formed with a flat surface B on one side in which surface an outlet opening C is formed, which opening is on the level of the chamber bottom so that the chamber may drain through it. Over this opening, a flat valve D is suspended to allow it to swing in to engage the surface B and close the opening, or out to uncover the opening, in the well known manner.

The connection of this chamber with the vacuum is made through a pipe E leading from the vacuum creating means and which enters the horizontal branch of a three branch fitting F arranged upon the bottom of the chamber. The upper vertical branch of this fitting enters through an aperture $a$ in the bottom of the chamber, and in turn has inserted into it the lower end of a tube G that extends vertically upward in the chamber to near the upper end thereof. This tube slips into the said fitting and is capable of removal or replacement at will, in order thus to allow for the cleansing of the chamber. A liquid tight joint is effected between the tube and the aperture $a$ by means of a packing ring $g$ so that liquid is prevented from being drawn down into the vacuum system.

In the lower vertical branch of the fitting F, a drain cock H is screwed, such drain cock being provided for draining away any moisture that might collect in the fitting by leakage or through the condensation of milk vapours that might pass over into the tube G. Or it may also be used to break the vacuum in the chamber A should occasion arise when such is needed.

The milk main K enters through the side of the chamber at a suitable height therein.

Provision may be made for a connection extending into either or both sides of the chamber.

M is the discharging chamber, which is made of the shape shown, having an open inner end formed with a flange M' that is adapted to fit flat against the surface B of the chamber A and to make airtight connection therewith in an approved manner. Such chamber is then fastened to such surface so that its open end surrounds the valve opening C, by means of the thumb nuts N or other approved fastening means.

The outer end of the chamber M is made with a discharge opening O therein and upon the outside of this end, a flap valve P is pivotally hung so that it may swing out to uncover the opening, or inward to seal it. This valve acts also in the well known manner, but its opening action is made more positive by the combination therewith of mechanical means combining with the pulsator used for pulsating the said chamber in the manner previously described.

The said pulsator is shown at R in Figure 1 and is of the type in which a slide valve R' is operated reciprocally by a rod r to effect the alternate connection of the chamber M with air and with the vacuum source. These movements of the rod r are employed to open the valve P and to free it to permit of its closing by the air pressure from without, and for this purpose a lever arm S is fixed to the valve and carried vertically upward for a distance. To the top of the lever, a cord S' is fastened and such cord is carried inward and through a loop S² secured to the chamber A and then out again and is fastened to the rod r. Thus when this rod moves in the direction to connect the chamber M with air, it pulls on the cord and the cord pulls on the top of the lever arm S to swing the valve out, and then on the reverse movement of the rod r the cord is slackened so that the valve may close. Thus any tendency of the valve to stick and prevent the milk discharge is overcome.

The usual pulsation connection of the chamber M is effected through a passage b bored horizontally through the flat portion B of the wall of chamber A and opens out through such portion above the valve opening C made therein.

Each of the valves D and P is made in any approved manner but preferably of a solid block of rubber of the required size and shape to cover the opening by overlapping its edges. This block is then pivotally suspended over its opening by casting or otherwise fitting into it wire loops d—p that hang over pins d'—p' projecting from the surface on which the valve is suspended.

We claim:—

1. In a milking machine releaser, the combination with a receiving chamber connected with a source of vacuum and with the milk pipe and having a discharge opening controlled by a gravity flap valve, of a discharging chamber fitted upon such receiving chamber and over the discharge opening thereof and itself having a discharge opening and a gravity flap hinged on the outside of such opening, a pulsator apparatus connected to such discharging chamber and operated by a reciprocating rod, a lever arm fixed to the flap valve of the discharging chamber, and a flexible cord attached to the end of such lever arm and to the said reciprocating rod and so arranged as to open the valve when the rod moves in one direction and to allow it to close when the rod moves in the other direction.

2. In a milking machine releaser, the combination with a receiving chamber having an opening in its bottom, of a tubular fitting disposed beneath the chamber bottom and having upper and lower vertical branches and an intermediate lateral branch, the upper vertical branch being fitted into the said opening, a drain cock in the lower vertical branch, a tube disposed vertically within the chamber and having its lower end socketed within the said opening to register with said upper branch, and a vacuum pipe connection leading into the lateral branch of the said fitting.

3. A milking machine releaser, comprising a receiving chamber having a removable cover, a milk main opening through the side wall of said chamber, a vertical tube leading upwardly into the chamber through the bottom wall thereof and terminating close to said cover, and a vacuum pipe external to the chamber and opening laterally into said tube at a point below said chamber.

4. A milking machine releaser, comprising a receiving chamber having a removable cover, a milk main opening through the side wall of said chamber, a vertical tube leading upwardly into the chamber through the bottom wall thereof and terminating close to said cover, a vacuum pipe external to the chamber and opening laterally into said tube at a point below said chamber, a discharging chamber fitted upon the receiving chamber and communicating with the same, a valve to control such communication, said discharging chamber having an outlet opening and a control valve therefor, and a pulsator connection communicating with the discharging chamber and operatively associated with its outlet valve to actuate the latter in timed relation to the action of the pulsator.

5. A milking machine releaser, comprising milk receiving and discharging chambers connected directly together and having an opening from one to the other and a valve controlling such opening, the discharging chamber having an outlet opening and a control valve therefor, a milk main leading into the receiving chamber, a vacuum connection leading into said receiving chamber, a pulsator apparatus, piping leading therefrom to said discharging chamber to connect and disconnect the latter with and from suction in alternation, and a positive operating connection between the pulsator apparatus and the outlet valve of the discharging chamber for opening and closing that valve inversely to the action of the pulsator.

In testimony whereof, we affix our signatures.

JOSEPH HOPKIRK.
GEORGE WILLIAM GANE.